(12) United States Patent
Michioka et al.

(10) Patent No.: US 8,033,729 B2
(45) Date of Patent: Oct. 11, 2011

(54) MOVEMENT GUIDING DEVICE FOR VACUUM ENVIRONMENT

(75) Inventors: Hidekazu Michioka, Tokyo (JP); Masahiko Yoshino, Tokyo (JP)

(73) Assignee: THK Co., Ltd., Tokyo (JP)

( * ) Notice: Subject to any disclaimer, the term of this patent is extended or adjusted under 35 U.S.C. 154(b) by 987 days.

(21) Appl. No.: 11/719,821

(22) PCT Filed: Oct. 31, 2005

(86) PCT No.: PCT/JP2005/019982
§ 371 (c)(1),
(2), (4) Date: May 21, 2007

(87) PCT Pub. No.: WO2006/054439
PCT Pub. Date: May 26, 2006

(65) Prior Publication Data
US 2009/0148083 A1    Jun. 11, 2009

(30) Foreign Application Priority Data

Nov. 22, 2004  (JP) .................................. 2004-337045
Oct. 28, 2005  (JP) .................................. 2005-315300

(51) Int. Cl.
*F16C 29/06*  (2006.01)
*F16C 33/80*  (2006.01)

(52) U.S. Cl. ........................................... 384/15; 384/45

(58) Field of Classification Search .................... 384/15, 384/43, 45
See application file for complete search history.

(56) References Cited

U.S. PATENT DOCUMENTS

| | | | | |
|---|---|---|---|---|
| 5,149,204 A | * | 9/1992 | Tennichi | .......................... 384/15 |
| 5,494,354 A | * | 2/1996 | Tsukada | .......................... 384/13 |
| 6,510,614 B1 | | 1/2003 | Kato et al. | |
| 2002/0027044 A1 | | 3/2002 | Michioka et al. | |
| 2004/0042690 A1 | | 3/2004 | Nakamura et al. | |

FOREIGN PATENT DOCUMENTS

| | | |
|---|---|---|
| CN | 1260451 A | 7/2000 |
| JP | 62-93425 U | 6/1987 |
| JP | 2-146217 U | 12/1990 |
| JP | 8-168202 A | 6/1996 |
| JP | 2000-27873 A | 1/2000 |
| JP | 2001-165162 A | 6/2001 |
| JP | 2002-122135 A | 4/2002 |
| JP | 2002-357221 A | 12/2002 |

OTHER PUBLICATIONS

International Search Report of PCT/JP2005/019982, date of mailing Dec. 27, 2005.
Chinese Office Action dated Aug. 28, 2009, issued in corresponding Chinese Patent Application No. 200580039660.
Chinese Office Action Dated Aug. 15, 2008 issued in corresponding Chinese Application No. 200580039660.X.

* cited by examiner

*Primary Examiner* — William C Joyce
(74) *Attorney, Agent, or Firm* — Westerman, Hattori, Daniels & Adrian, LLP (57) ABSTRACT

A movement guiding device for a vacuum environment is provided so that the device is able to suppress a base oil vaporized in the vacuum environment from leaking to the outside. The movement guiding device for a vacuum environment according to the present invention comprises a track member (1) having a rolling-element rolling part (1*a*), a moving member (2) having a rolling-element circulation passage containing a loaded rolling-element rolling part (2*a*) facing the rolling-element rolling part (1*a*) and being movable relatively to the track member (1), a plurality of rolling elements (3) arranged in the rolling-element circulation passage, clearance seals (5, 6) arranged with the moving member (2) and sealing a clearance formed between the track member (1) and the moving member (2) without coming in contact with the track member (1).

3 Claims, 11 Drawing Sheets

SECTION ALONG B-B LINE

SECTION ALONG C-C LINE

DETAIL OF D PART

FIG. 7

CONCAVO-CONVEX SHAPE

(B) TRIANGULAR SHAPE (C) STRAIGHT SHAPE

TRIANGULAR SHAPE

MOVEMENT GUIDING DEVICE FOR VACUUM ENVIRONMENT

TECHNICAL FIELD

The present invention relates to a movement guiding device, such as a linear guide, ball spline, and ball screw, in which there are provided a track member and a moving member and rolling elements such as balls or rollers which interposed between the track member and the moving member, and in particular to a vacuum-environment-dedicated movement guiding device used in a vacuum environment.

BACKGROUND ART

A movement guiding device provided with rolling elements, such as balls or rollers, and arranged in guiding parts of a moving object moving linearly have now been used so that the device is able to perform a guide function using rolling movements of the rolling elements. In late years, this kind of movement guiding device has many applications in a clean environment, which is required by, for example, apparatuses for manufacturing semiconductors and liquid crystal products, and medical facilities. With semiconductors highly integrated and other factors, it has now been indispensable that semiconductor manufacturing lines be processed in a vacuum atmosphere.

When a general type of grease is applied in a vacuum environment, the grease is subjected to vaporization of its oil component so that lubricating property will be lost in the grease. Therefore, even if a movement guiding device is used under normal use conditions without any problem, the movement guiding device will encounter various problems when being used in the vacuum environment. The problems include not only an early disappearance of lubricating property of the grease applied inside the device but also discharging a vaporized gas from the grease, resulting in a fear that the outside environment is polluted.

In consideration of these problems, as a lubricant applied in movement guiding devices used in the vacuum environment, a vacuum grease is used which contains an inert fluorinated oil as its base oil. This vacuum grease is lower in general in steam pressure than a grease which contains a mineral oil to be used in the atmosphere. However, for applications in higher vacuum environments, use of the vacuum grease inevitably results in the vaporization of the oil component. Hence it is obliged to use a solid lubricant.

DISCLOSURE OF INVENTION

Problems to be Solved by the Invention

By the way, the vacuum grease and the solid lubricant are confronted to another difficulty that material costs are higher. In addition, even when the vacuum grease is used, its base oil is still vaporized in the vacuum environment although an amount of such vaporization is a few. This causes a fear that the vaporized component leaks to the outside. In a case where the inside of a movement guiding device is air-tightly sealed, it is avoidable that the vaporized grease leaks to the outside as a gas. However, this sealing technique causes another difficulty as well. That is, if a rubber-made seal is attached to the moving member and located to touch the track member, the seal wears due to slide with the track member, thus causing dust. The dust caused in the vacuum environment is not wanted, resulting in that no such seals touching the track member are arranged in the movement guiding device being used in the vacuum environment.

Therefore, an object of the present invention is to provide a movement guiding device usable in the vacuum environment, in which the device is able to suppress the base oil of grease from vaporizing in the vacuum environment and leaking out to the outside and to prevent dust being caused.

Means for Solving the Problem

The present invention will now be described below. In the followings, reference numerals appearing in the accompanying drawings are added to components in brackets for ease in understanding the present invention, but this is not intended that the present invention is limited to the modes shown in the drawings.

In order to solve the foregoing problem, a first aspect of the invention provides a movement guiding device, which is for use in the vacuum environment and characterized in that the device comprises a track member (1) having a rolling-element rolling part (1a), a moving member (2) having a rolling-element circulation passage containing a loaded rolling-element rolling part (2a) facing the rolling-element rolling part (1a) and being movable relatively to the track member (1), a plurality of rolling elements (3) arranged in the rolling-element circulation passage, clearance seals (5, 6, 31, 33) arranged with the moving member (2) and sealing a clearance formed between the track member (1) and the moving member (2) without coming in contact with the track member (1). By this configuration, the foregoing problem is solved. In the present invention, the term "vacuum" is referred to as space of which pressure is lower than the atmosphere.

A second aspect of the invention is based on the movement guiding device for the vacuum environment and characterized in that the clearance seal (5, 31, 33) has a surface facing the track rail (1), wherein the surface is formed to have a concavo-convex shape.

A third aspect of the invention is based on the movement guiding device for the vacuum environment and characterized in that a clearance formed between the clearance seal (5, 6, 31, 32) and the track member (1) is set to 0.25 mm or less, when the clearance is measured at a portion of the clearance seal (5, 6, 31, 32), which portion is the closest to the track rail (1).

A fourth aspect of the invention provides a movement guiding device, which is for use in the vacuum environment and characterized in that the device comprises: a track member (1) having a rolling-element rolling part (1a); a moving member (2) having a rolling-element circulation passage containing a loaded rolling-element rolling part (2a) facing the rolling-element rolling part (1a) and being movable relatively to the track member (1); a plurality of rolling elements (3) arranged in the rolling-element circulation passage; and an end clearance seal (5) arranged with an end of the moving member (2) in moving directions thereof and formed to have an opening (9a, 10a) of which contour is consistent with a sectional form of the track member (1), wherein the end clearance seal (5) is located without coming in contact with the track member (1) and a clearance formed between the end clearance seal (5) and the track member (1) is smaller than a clearance formed between the moving member (2) and the track member (1). By this configuration, the foregoing problem is solved.

A fifth aspect of the invention is based on the movement guiding device for the vacuum environment and characterized in that the end clearance seal (5) has a surface facing the track rail (1), wherein the surface is formed to have a concavo-convex shape.

A sixth aspect of the invention is based on the movement guiding device for the vacuum environment and characterized in that the end clearance seal (5) comprises a plurality of first plates (9) formed into thin plates and a plurality of second plates (10) formed into thin plates, wherein the first and second plates are laminated on one another in an alternate order between the first and second plates; the first and second plates (9, 10) have an opening (9a, 10a) whose contour is made consistent with a shape of the track member (1); and a clearance (.beta.) formed between the second plates (10) and the track member (1) is made larger than a clearance (a) formed between the first plates (9) and the track member (1) so that the surface of the end clearance seal (5), which surface faces the track member (1), is formed to have the concavo-convex shape, provided the first and second plates (9, 10) laminated on one another.

A seventh aspect of the invention provides a movement guiding device for a vacuum environment, which is for use in the vacuum environment and is characterized in that the device comprises: a track member (1) having an upper surface and side surfaces and having a longitudinal direction, wherein a rolling-element rolling part (1a) is formed on the track member so as to extend along the longitudinal direction; a moving member (2)i) having a central part (4a) facing the upper surface of the track member (1) and stem parts (4b) facing the side surfaces of the track member so that the moving member is formed into a saddle shape as a whole, ii) having a rolling-element circulation passage containing a loaded rolling-element rolling part (2a) facing the rolling-element rolling part (1a); and iii) being movable relatively to the track member (1); a plurality of rolling elements (3) arranged in the rolling-element circulation passage; a side clearance seal (6, 31, 32) arranged on each of the stem parts (4b) of the moving member (3) and located to extend over both ends of the moving member (3) in moving directions thereof; and wherein the side clearance seal (6, 31, 32) is located without coming into contact with the track member (1) and a clearance formed between the side clearance seal (6, 31, 32) and the track member (1) is smaller than a clearance formed between the track member (1) and the moving member (3).

An eighth aspect of the invention is based on the movement guiding device for the vacuum environment and characterized in that the device further comprises an end clearance seal (5) arranged with each of the ends of the moving member (2) in the moving directions thereof and formed to have an opening (9a, 10a) of which contour is consistent with a sectional form of the track member (1), wherein the end clearance seal (5) is located without coming in contact with the track member (1) and a clearance formed between the end clearance seal (5) and the track member (1) is smaller than a clearance formed between the moving member (2) and the track member (1).

A ninth aspect of the invention is based on the movement guiding device for the vacuum environment and characterized in that the side clearance seal (31, 33) has a surface (31a, 33a) facing the track member, wherein the surface of the side clearance seal has a plurality of grooves (32, 34) formed thereon so as to extend the moving directions of the moving member.

ADVANTAGEOUS EFFECTS OF THE INVENTION

In the first aspect of the invention the clearance seal is attached to the moving member, so that lubricant inside the movement guiding device can be suppressed from being evaporated and leaked out to the outside. Hence the duration of life of the lubricant becomes longer and the external environment can be prevented from being polluted. In addition, since there is no contact between the clearance seal and the track member, there is no dust which is due to wear.

In the second aspect of the invention the clearance seal have the surface facing the track member and the surface is formed to have a concavo-convex shape, whereby a flow of gas, which evaporates from the lubricant, between the track member and the clearance seal undergoes larger amounts of resistance, compared to a case where the surface is flat. Accordingly, it is possible to suppress the lubricant inside the movement guiding device from evaporating, so that the gas leaking to the outside can be lessened.

In the third aspect of the invention the clearance is set to 0.25 mm or less, resulting in that an amount of leakage to the outside can be reduced efficiently.

In the fourth aspect of the invention the end clearance seal attached to the moving member suppresses lubricant inside the movement guiding device from evaporating and leaking to the outside.

In the fifth aspect of the invention the end clearance seal have the surface facing the track member and the surface is formed to have a concavo-convex shape, whereby a flow of gas, which evaporates from the lubricant, between the track member and the end clearance seal undergoes larger amounts of resistance, compared to a case where the surface is flat. Accordingly, it is possible to suppress the lubricant inside the movement guiding device from evaporating, so that the gas leaking to the outside can be lessened.

In the sixth aspect of the invention by limiting the thin first and second plates on one another, the concavo-convex shape can be formed.

In the seventh aspect of the invention the side clearance seal attached to the moving member suppresses lubricant inside the movement guiding device from evaporating and leaking to the outside.

In the eighth aspect of the invention by disposing the end clearance seal and the side clearance seal, a clearance formed between the saddle-shaped moving member and the track member can be surrounded.

In the ninth aspect of the invention the side clearance seal have the surface facing the track member and the surface is formed to have a concavo-convex shape, whereby a flow of gas, which evaporates from the lubricant, between the track member and the side clearance seal undergoes larger amounts of resistance, compared to a case where the surface is flat. Accordingly, it is possible to suppress the lubricant inside the movement guiding device from evaporating, so that the gas leaking to the outside can be lessened.

BRIEF DESCRIPTION OF REFERENCES

1 . . . track rail (track member)
1a . . . ball rolling groove (rolling-element rolling part)
2 . . . moving member
2a . . . loaded ball rolling groove (loaded ball rolling part)
3 . . . balls (rolling elements)
4 . . . moving block
4a . . . central part
4b . . . stem part
5 . . . end clearance seal (clearance seal)
6, 31, 33 . . . side clearance seal (clearance seal)
9 . . . first plate
10 . . . second plate
9a, 10a . . . opening
12, 20 . . . clearance
31a, 33a . . . side-clearance seal surface facing track rail
32, 34 . . . groove
α, β . . . clearance

BEST MODE FOR CARRYING OUT THE INVENTION

Figure 1:
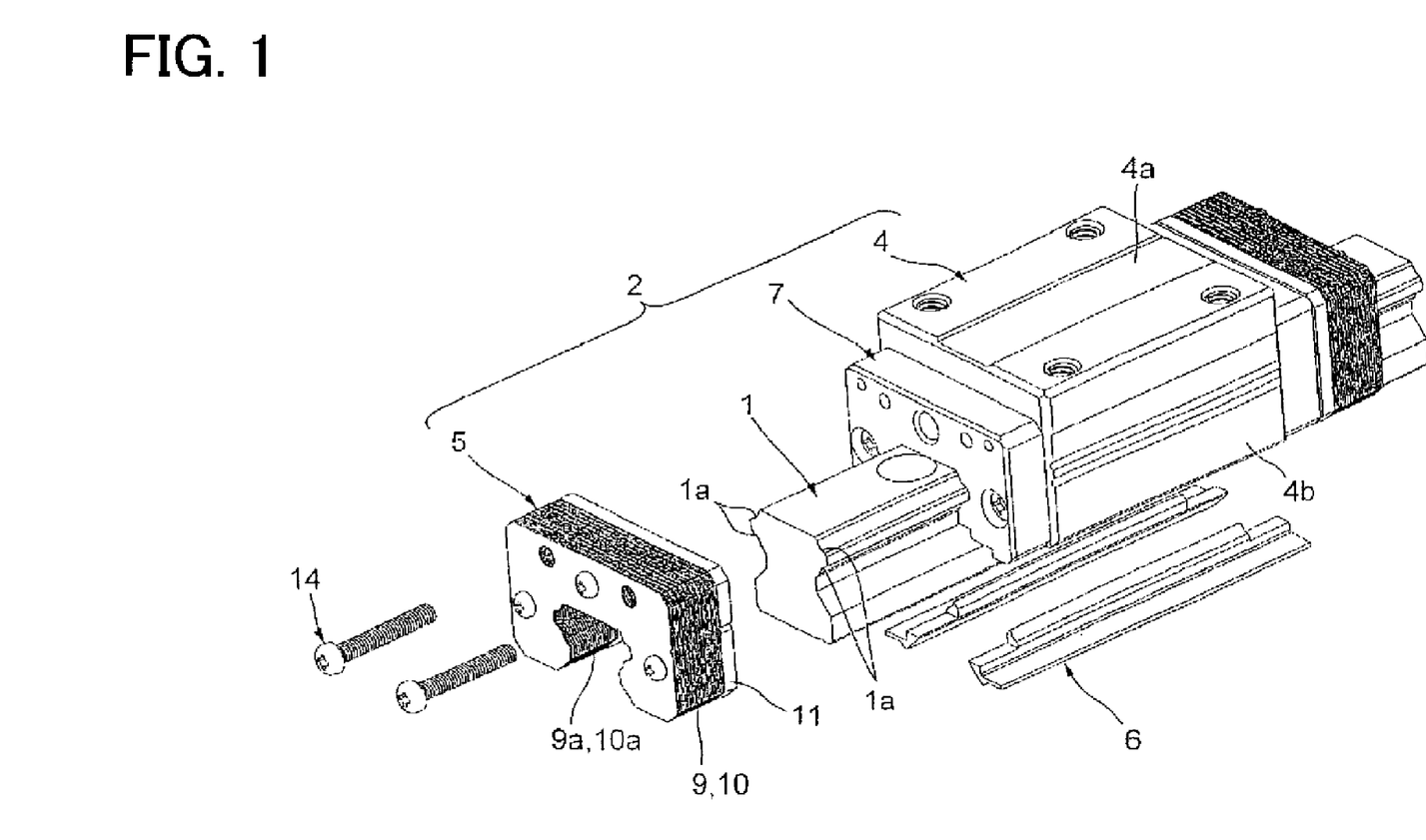
FIG. 1 is a perspective view showing a movement guiding device according to an embodiment of the present invention.
Figure 2:
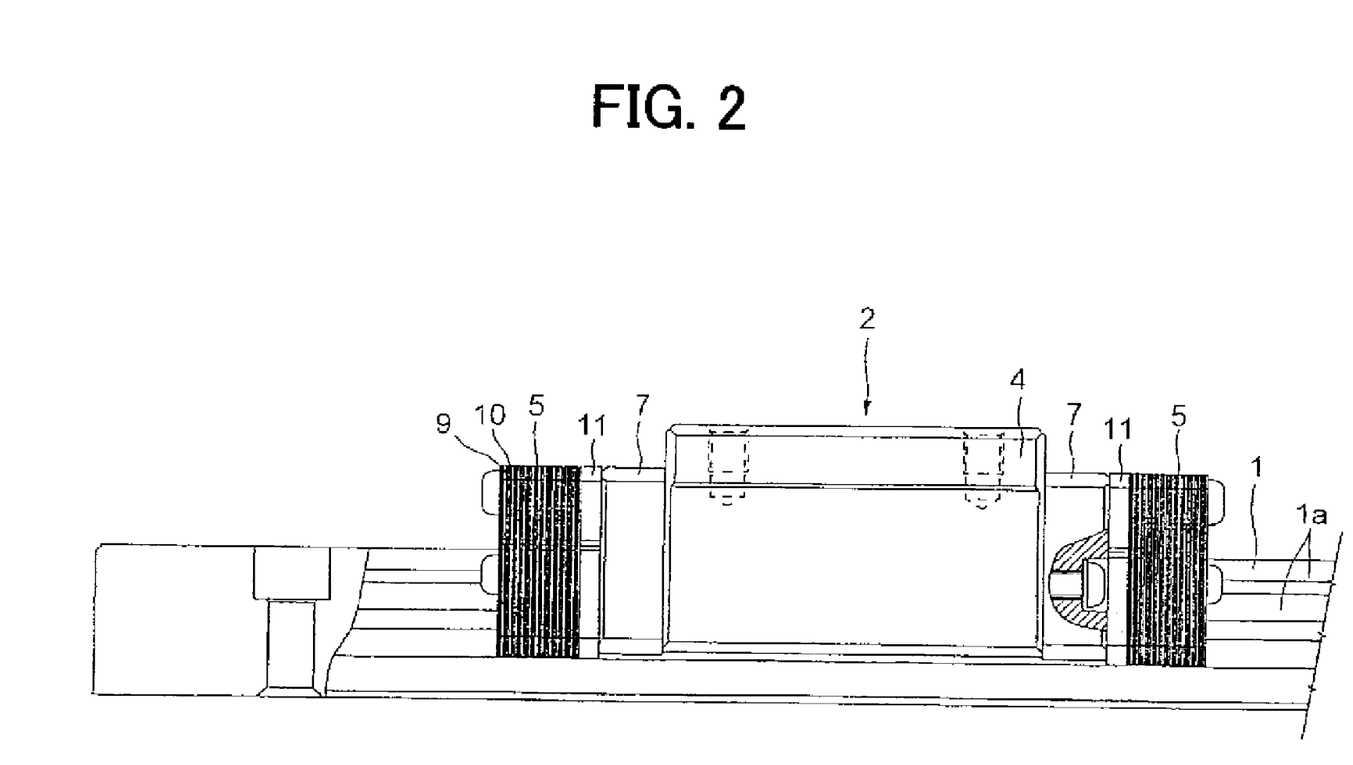
FIG. 2 is a side view showing the movement guiding device.
Figure 3:
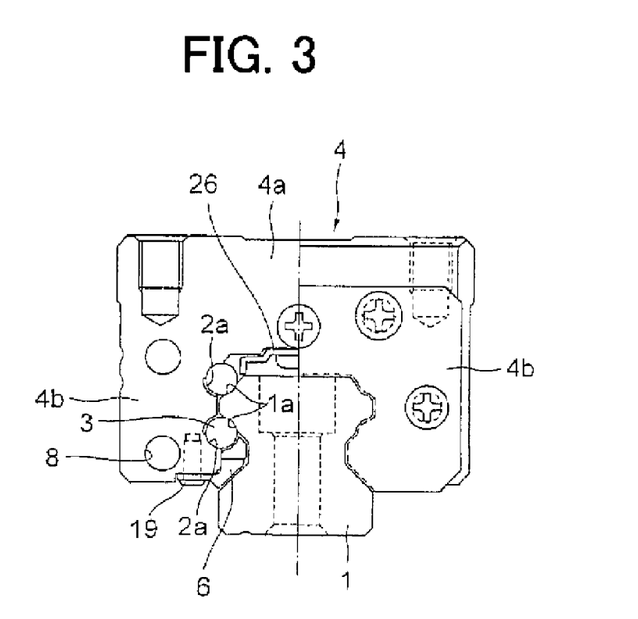
FIG. 3 is the frontal view of the movement guiding device (the view includes in part a sectional view of the device)

FIGS. 1 to 3 show a movement guiding device for use in a vacuum environment, which is adopted in an embodiment according to the present invention (hereinafter, this device is simply referred to as a "movement guiding device"). This movement guiding device is used in vacuum environment, practically, in spaces whose pressures are lower than the atmosphere.

FIG. 1 shows a perspective view of the movement guiding device, FIG. 2 shows a side view thereof, and FIG. 3 shows a frontal view thereof (partly containing a sectional view). The movement guiding device adopted by the present embodiment is called a linear guide and is provided with a track rail 1 serving as a track member extending linearly and a moving member 2 movably assembled with the track rail 1 with balls 3 interposed therebetween, the balls serving as a number of rolling elements.

The track rail 1 has right and left side surfaces on which ball rolling grooves 1a serving as rolling-element rolling parts are formed to extend along a longitudinal direction of the rail. Each of the ball rolling grooves 1a has an arch-shaped section that has a curvature radius slightly larger than the radius of each ball 3. In the present embodiment, on each of the right and left side surfaces of the track rail 1, the two ball rolling grooves 1a are formed at upper and lower parts, so that the four ball rolling groves 1a are formed on both side surfaces in total. Of course, the number of rails and positional arrangements are set to various modes depending on values of load applied to the device and some other factors.

The moving member 2 is composed of a moving block 4 and clearance seals 5 and 6 both attached to the moving block 4, in which the moving block 4 is formed to have a ball circulation passage including loaded ball rolling grooves 2a facing the ball rolling groves 1a, respectively. The clearance seals are classified into end clearance seals 5 respectively attached to both side faces of the moving block located in the moving directions thereof and side clearance seals 6 respectively attached to both side surfaces of the moving block.

As shown in FIG. 3, the moving block 4 is formed as a whole into a saddle shape and has a central part 4a to be opposed to the upper surface of the track rail 1 and stem parts 4b respectively extending downward from on both right and left sides of the central part 4a so as to face right and left side surfaces of the track rail 1.

A plurality of balls 3 are interposed between each ball rolling groove 1a of the track rail 1 and each loaded ball rolling groove 2a of the moving block 4. The balls 3 which roll along a loaded ball rolling passage formed between each ball rolling groove 1a and each loaded ball rolling groove 2a is subject to pressurization.

On both ends of the moving block 4 in the movement directions thereof, there are attached end plates 7 (refer to FIG. 1) in which U-shaped direction changing passages are formed, respectively. The balls 3 which have rolled and reached one end of the loaded ball rolling passage of the moving block 4 enters the U-shaped direction changing passage formed in each end plate 7. After circulating the U-shaped direction changing passage, the balls enter a non-loaded ball return passage 8 (refer to FIG. 3) which extends in parallel to the loaded ball rolling passage. The balls 3, which have passed the non-loaded ball return passage 8, circulate the direction changing passage of the opposite-side end plate 7, and again enter the loaded ball rolling passage. A ball circulation passage is composed in a circuit form by a combination of the liner loaded ball rolling passage, the U-shaped direction changing passages, and the liner non-loaded ball return passage 8.

The track rail 1, moving block 4 and end plates 7 are made of metal, practically, of stainless steel, to make it difficult to cause gas in the vacuum environment or to make it difficult to cause rust. In the standard movement guiding device, the end plates 7 are made of resins such as TORAYCA®. However, if such a resin is used, it is resulted in that the resin retains the moisture, a gas (vapor) is generated from the end plates in the vacuum environment. Use of the stainless steel provides a solution to such a problem. Incidentally, instead of the stainless steel, fluorocarbon resin, PEEK material, and other materials may be used, which are made of resins but still resistant to retaining the moisture.

As shown in FIG. 1, to both end faces of the moving block 4 located in the movement directions thereof, the end clearance seals 5 are attached, respectively, which serve as clearance seals. Each end clearance seal 5 is composed of a plurality of first thin plates 9 and a plurality of second thin plates 10, which are laminated on one another in an alternate order between the first and second plates, and a holding plate 11 attached to each of the first and second plates 9 and 10. The end clearance seal 5 has openings 9a and 10a of which contours are in accord with the outer shape of the track rail 1.

As shown in FIG. 3, when viewed along the moving directions of the moving block 4, there is formed a considerable amount of clearance between the moving block 4 and the track rail. When the end plates 7 are attached to the block, there is also formed a clearance between the end plate 7 and the track rail 1. The end clearance seals 5 are arranged to make the clearance formed between each clearance seal 5 and the track rail 1 as smaller as possible.

Figure 4:
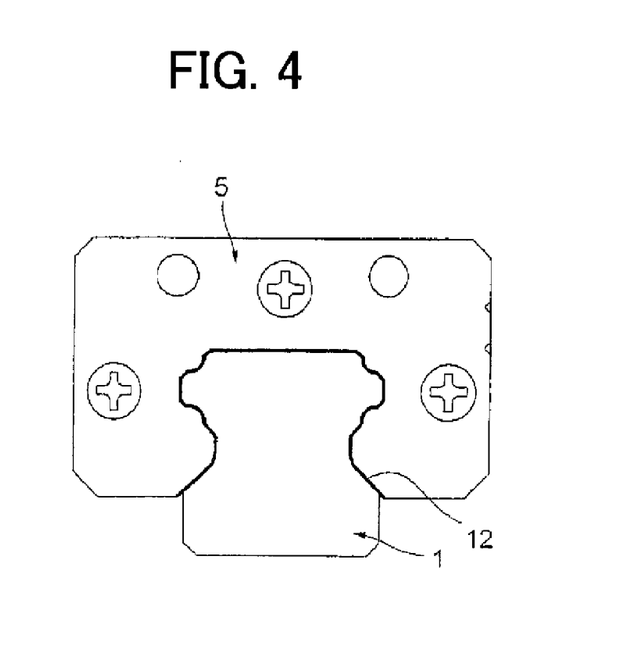
FIG. 4 is the frontal view of the movement guiding device to which an end clearance seal is attached.

FIG. 4 shows the frontal view of the moving guiding device to which the end clearance seals 5 are attached. In each end clearance seal 5, there are formed the openings 9a and 10a respectively having a contour which is consistent with the outer shape of the track rail 1. The sizes of the openings 9a and 10a are larger than the outer shape of the track rail 1, thus forming a slight clearance 12 between each end clearance seal 5 and the track rail 1 so as to be located along the track rail 1. The end clearance seals 5 are allowed to move along the track rail 1 with a slight clearance kept therebetween, without contacting the track rail 1. The clearance 12 will detailed later.

Figure 5:
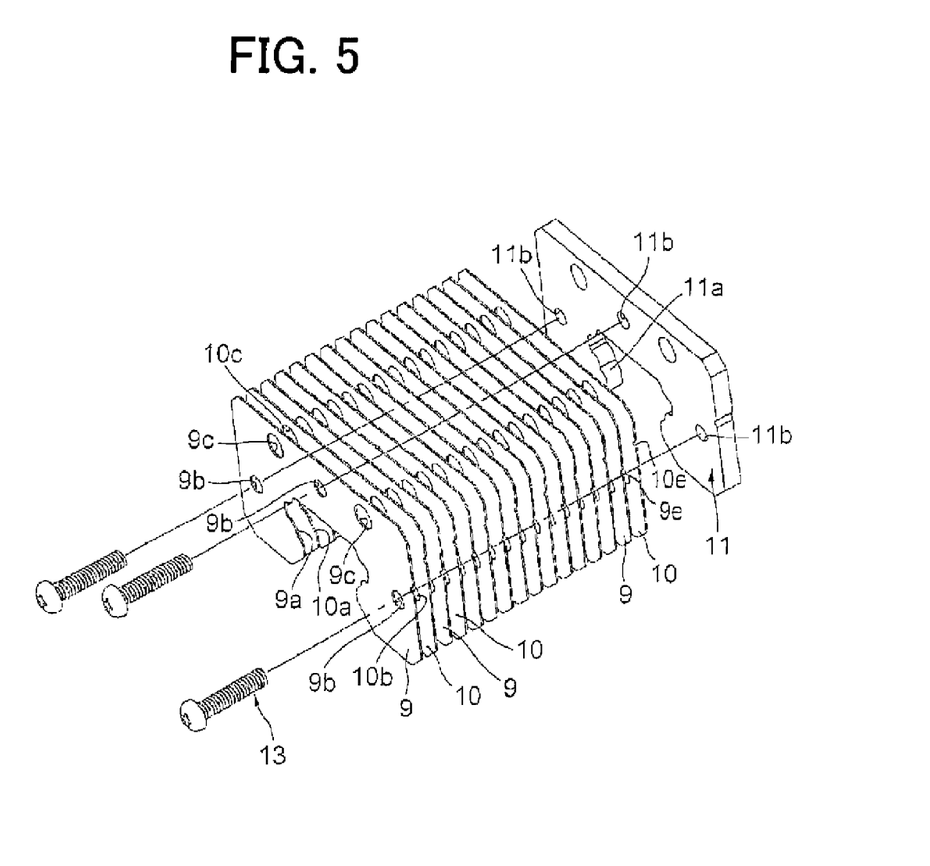
FIG. 5 is a disassembled perspective view of the end clearance seal.

FIG. 5 shows a perspective view of one of the end clearance seals 5. The first plates 9 are manufactured by stamping a thin metal plate such as stainless steel. Each of the first plates 9 is shaped into an approximately rectangular form and has a central part on a one side thereof, where the central part is formed to have an opening 9a of which shape is consistent with the contour of sections of the track rail 1. The shape of the opening 9a is slightly larger than the sectional contour of the track rail 1. Through-holes 9b allowing screws 13 or other securing elements to be passed therethrough for securing the first and second plates 9 and 10 to each holding plate 11 are formed through each of the first plates 9 at positions surrounding the opening 9a. Further, at both positions laterally neighboring the uppermost one of the through-holes 9b of the respective first plates, through-holes 9c are formed therethrough which allow screws 14 (refer to FIG. 1) or other securing elements to pass through for securing each end clearance seal 5 to the moving block 4. A triangular notch 9e is formed on a side of each of the first plates 9.

Each of the second plates 10 is also formed into an approximately rectangular form and has a central part on a one side thereof, where the central part is formed to have an opening 10a of which shape is consistent with the contour of sections of the track rail 1. Though detailed later, the openings 10a of the second plates 10 are slightly larger in contours than the openings 9a of the first plates 9. Accordingly, laminating the first and second plates 9 and 10 alternately one on another creates a concavo-convex shape along par of the opening portion. Around the opening 10a of each of the second plates 10, through-holes 10b allowing the screws 13 or other securing elements to pass therethrough are formed. The second plates 10 are also manufactured, for example, by stamping a thin metal plate such as stainless steel. On a side of each of the second plates 10, a triangular notch 10e is formed so as to be shifted from that of each of the first plates 9 in the longitudinal direction. The formation of the notches makes it possible that the first and second plates 9 and 10 are distinguished from each other, when viewing the appearance of each seal after assembling thereof. Instead of using the stamping technique to produce the first and second plates 9 and 10, laser beam machining or wire electric discharge machining can be used for the production, whereby the first and second plates 9 and 10 are improved in their dimensional accuracy.

In order that each of the end clearance seals 5 has a lot of concavo-convex shapes, it is desirable that the first and second plates 9 and 10 are made thinner. In contrast, when considering preventing deformations due to tightening the plates with the screws 13, it is preferred that the first and second plates 9 and 10 have a certain degree of thickness. In light of these mutually conflicting needs, the first and second plates 9 and 10 are produced to have a thickness of 0.2 mm or thereabouts, for instance. Of course, various thickness amounts other than the above may be available depending on factors including the size of the moving block 4.

The holding plate 11 is made thicker than the first and second plates 9 and 10. This holding plate 11 has also an opening 11a which is consistent in shape with the track rail 1. At positions around the opening 11a of the holding plate 11, female screw portions 11b are formed to be engageable with the screws 13. An assembling jig is used such that the first and second plates 9 and 10 and the holding plate 11 are pushed to this assembling jig for positioning, and the screws 13 are applied to combine those plates.

Figure 6:
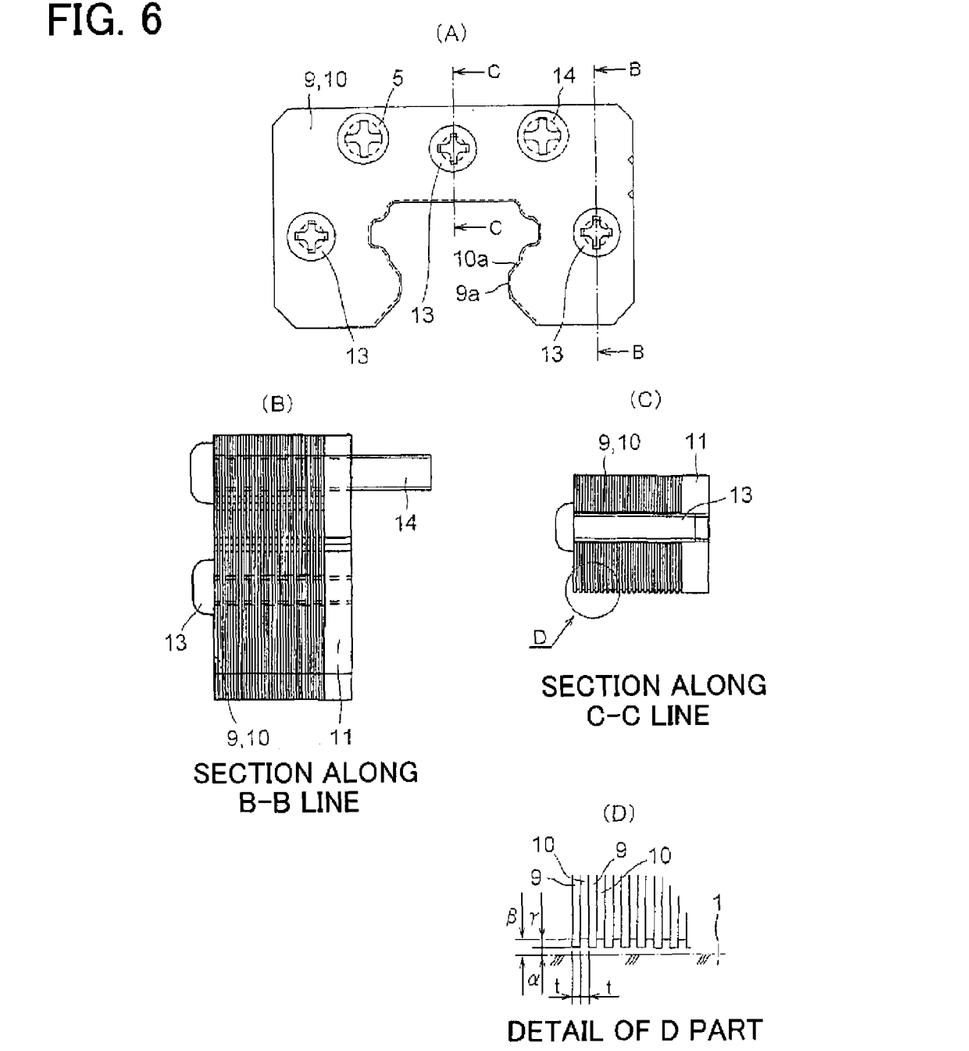
FIG. 6 is a view showing the laminated end clearance seal (, in which Figure (A) shows the frontal view, Figure (B) shows a section taken along a B-B line in Figure (A), Figure (C) shows a section taken along a C-C line in Figure (A), and Figure (D) shows a detailed view of a D part in Figure (C))
Figure 7:
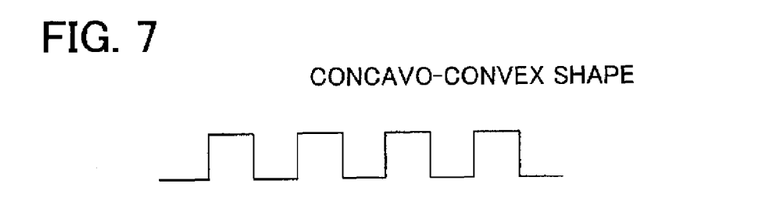
FIG. 7 is a view showing the sectional shape of a surface of the end clearance seal, the surface facing the track member.

FIG. 6 shows each of the end clearance seals 5 in which the plates are lamented on one another. As shown in FIG. 6(A), the opening 10a formed in each of the second plates 10 has a contour which is slightly larger than the contour of the opening 9a of each of the first plates 9. Thus, as shown in FIG. 6 (C) and (D), the surface of the end clearance seal 5, which faces the track rail 1, is formed to have a concavo-convex shape (also refer to FIG. 7). With the first and second plates 9 and 10 laminated on one another, a clearance $\beta$ formed between the second plates 10 and the track rail 1 is larger than a clearance $\alpha$ formed between the first plates 9 and the track rail 1.

Without laminating the plurality of first and second plates on one another, the concavo-convex shape can be formed on the end clearance seal 5, for example, by forming a plurality of grooves on a solid member. However, in this case, as the number of repeated concavo-convex patterns is increased, the process work becomes harder. If the problem to this process work is overcome, the plurality of grooves may be formed on the solid member.

In a state where each end clearance seal 5 is attached to the moving block 4, the clearance $\alpha$ between a portion of the first plates 9 which is the closest to the track rail 1 and the track rail 1 is set to 0.25 mm or less. The smaller this clearance $\alpha$, the larger the resistance caused when a gas flows through the passage (i.e., the gas is difficult to leak to the outside), so that the it is preferred that a target value to the clearance $\alpha$ is set to some 0.05 to 0.06 mm or less than it. However, since the track rail 1 involves a tolerance in its processing, setting the clearance to a too small amount may cause a contact between the end clearance seals 5 and the track rail 1. Thus, in the present embodiment, in consideration of a tolerance ±0.1 mm of the track rail 1, a tolerance ±0.05 mm of the clearance seal 1, and an variation 0.02 to 0.03 mm of the clearance $\alpha$ due to loads applied to the movement guiding device, the clearance $\alpha$ is set to some 0.02 to 0.25 mm, preferably to some 0.05 to 0.15 mm.

In the present embodiment, a difference $\gamma$ in height (step) between the first plates 9 and the second plates 10 is approximately equal to a thicknesses t of each of the first and second plates 9 and 10, and for example set to some 0.2 mm. The larger the difference $\gamma$ between the heights, the larger a contact area of the plates, thereby increasing resistance against which the gas flowing through the passage encounters. Of course the thicknessses t and the difference γ both will not be limited to 0.2 mm, but may be set to other appropriate values, such as 0.1 mm, 0.3 mm, or others.

Prior to attaching the end clearance seals 5 to the moving block 4, lubricant such as grease is supplied to the moving block 4. The supplied lubricant is applied to the balls 3 in the moving block via, for example, an oil supply nipple, a lubricant supply passage, and other components. While the balls 3 are moved along the passage, the lubricant is applied to all the balls 3, ball rolling grooves 1a, and loaded ball roiling grooves 2a. If the lubricant is exposed to the vacuum environment, the base oil is vaporized from the lubricant to be converted to a gas.

The end clearance seals 5 are able to move without touching the track rail 1. The clearance 12 formed between the inner surfaces of the end clearance seals 5 and the track rail 1 is made as smaller as possible and the surface of each of the end clearance seals 5, which faces the track rail 1, is formed into a concavo-convex shaped surface. Hence, when a gas flows along the passage formed between the end clearance seals 5 and the track rail 1, a large amount of resistance is caused against the gas flow.

Because arrangement of the end clearance seals 5 makes it difficult that the gas leaks to the outside, the lubricant is able to have a longer operating life and it is possible to prevent the outside environment from being polluted. Additionally, the grease to be applied can be lowered in quality by one rank, so that a grease next to the fluorinated grease showing the highest resistance to the vaporization is available.

Figure 8:
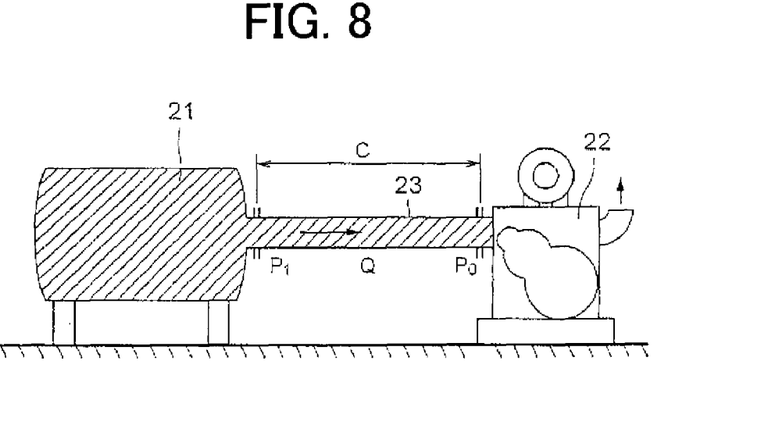
FIG. 8 is a pictorial view showing a flow produced when a vacuum container and a vacuum pump is licked by a passage.

It can be considered that the resistance against a gas flow is almost identical to the electric resistance. The reciprocal number of the resistance to the gas flow is called "conductance," which indicates how easily the gas flows. FIG. 8 pictorially illustrates a gas flow produced when a vacuum container 21 and a vacuum pump 22 is linked via a passage 23 (of which conductance is C). When it is assumed that an orifice has the conductance C $(m^3 \cdot s^{-1})$ and pressures at both ends of the orifice is P1, P2 (Pa), an amount Q of gas flowing through the orifice is expressed by the following formula:

$$Q = C(P_1 - P_0)(Pa \cdot m^3 \cdot s^{-1})$$ (Numeral 1)

Figure 9:
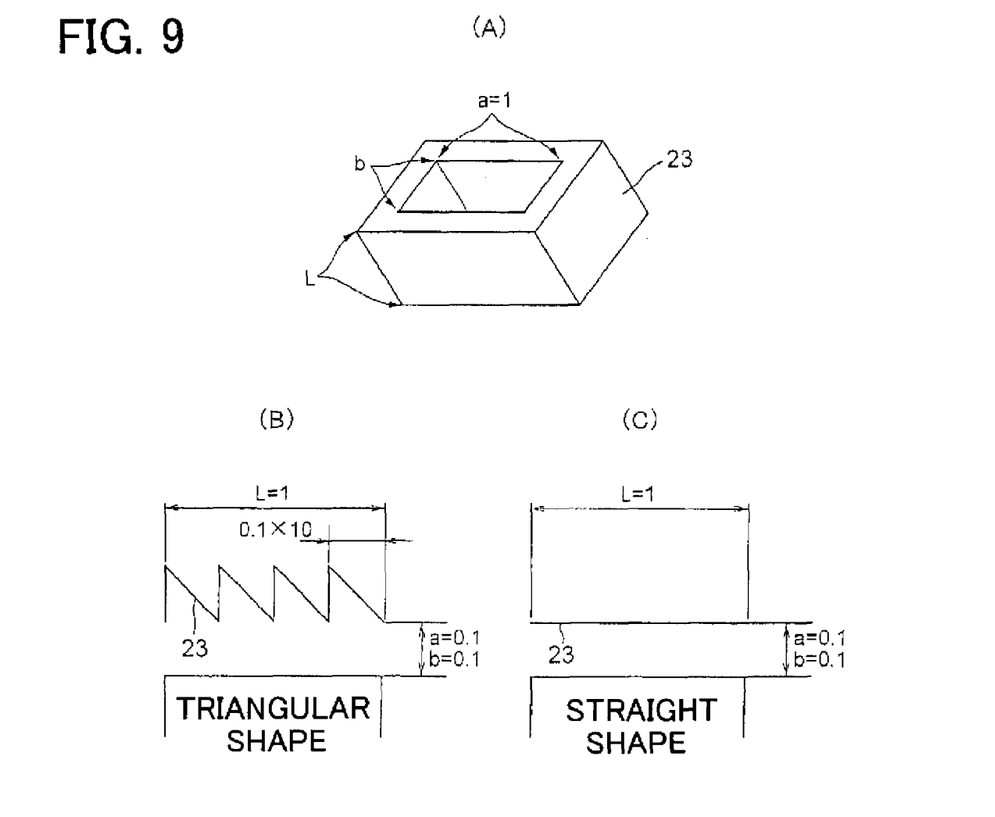
FIG. 9 is a view showing differences of conductance created when the side surface of the passage is formed into a straight shape or a triangular shape (Figure (A) shows a perspective view of the passage, Figures (B) and (C) show sections of the passage when being viewed along the passage)

FIG. 9 illustrates differences of conductance created when a side surface of the passage is formed into a straight shape or a triangular shape. Figure (A) is a perspective view of the passage 23 used for the calculation, whilst Figures (B) and (C) illustrate a section of the passage 23 taken along the passage 23. Of these, Figure (B) shows a sectional view in which triangles serving as the concavo-convex shape appear repeatedly on the side of the passage 23, whilst Figure (C) shows a sectional view in which the side of the passage 23 is made straight. In Figures, references "a" and "b" indicate longitudinal and lateral dimensions of sections of the passage and a reference L indicates a length in the length direction of the passage.

The conductance crated in cases where the passage shape is triangular as shown in Figure (B) is expressed by the following "numeral 2" formula:

$$C = C1 \times K = 11.6ab \times 10^{-2} \times K = 1.67 \times 10^{-3} [l/S],$$ (Numeral 2)

wherein k denotes a correction coefficient depending on how the concavo-convex shape is and C1 denotes the conductance of the orifice having a sectional area "ab."

The conductance crated in cases where the passage shape is straight as shown in Figure (C) is expressed by the following "numeral 3" formula:

$$C = Ka^2b^2/\pi(a+b)L = 4.05 \times 10^{-3} [l/S]$$ (Numeral 3)

When comparing the "Numeral 2" and "Numeral 3" formulae, it is found that the conductance obtained when the passage 21 has the triangular sectional shape is reduced by 41% than that obtained when the passage 23 has the straight sectional shape. Concretely, compared to the straight sectional shape of the passage 23, the triangular sectional shape of the passage 23 has a smaller conductance. The present embodiment adopts the way in which the press-molded first and second plates are laminated on one another to form the concavo-convex shape, resulting in that the concavo-convex shape is necessarily provided as a quadrangular shape. In the present embodiment, the calculation of a conductance for a quadrangular sectional shape is not provided, but it is surely estimated that the conductance for the quadrangular sectional shape also becomes smaller similarly to the triangular sectional shape.

Incidentally the foregoing "Numeral 2" and "Numeral 3"formulae, which are on the assumption that the passage 23 is expressed as in FIG. 9, explain that the passage 23 having the triangular sectional shape has a lower conductance. However, the end clearance seals 5 according to the present embodiment differ in clearance shape from the passage 23 exemplified in FIG. 9, so that a conductance value obtained from each of the end clearance seals 5 also differ from the values on the "Numeral 2" and "Numeral 3" formulae. Thus, in the later-described example, the conductance value of each of the end clearance seals 5 will be estimated.

In the present embodiment, 40 plates each having a thickness of 0.2 mm were laminated on one another to manufacture the end clearance seal 5 having a length of 8 mm in the length direction. However, this is not a definitive dimensional example. The longer the length L of each of the end clearance seals 5 in the length direction, the smaller the conductance. In contrast, as the length L becomes longer, the strokes of the moving block 4 are obliged to be shortened depending on the lengthened length L. Based on these mutually conflicting requirements, the length L can be decided.

In addition, as the number of repeated concavo-convex shapes increase, the conductance is lowered. Hence the concavo-convex shape makes it possible to shorten the length L in the length direction L.

Figure 10:
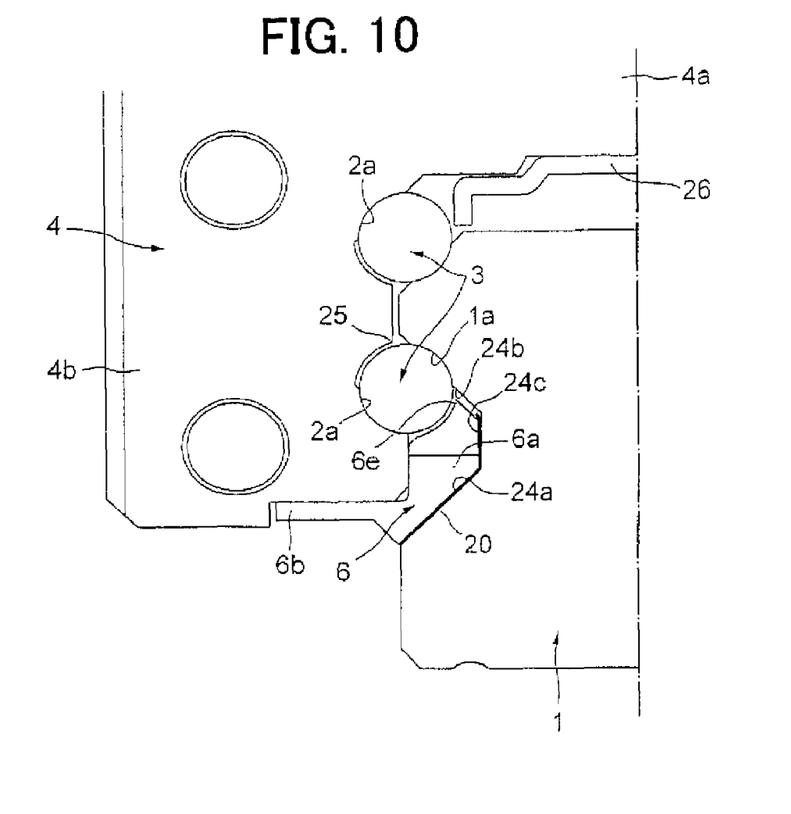
FIG. 10 is a frontal view showing a side clearance seal attached to the moving block.
Figure 11:
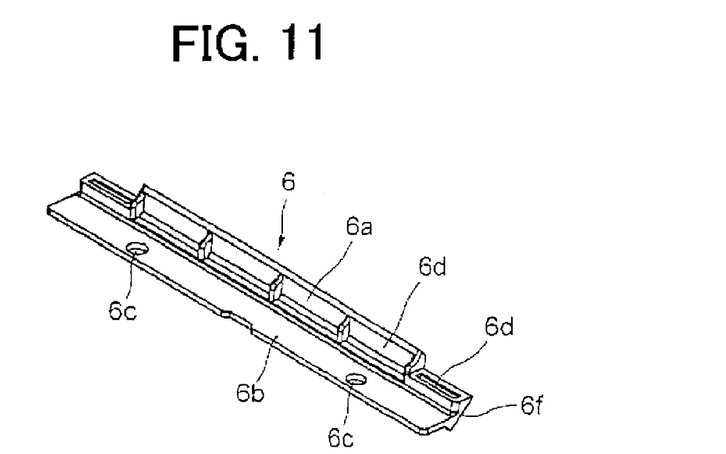
FIG. 11 is a perspective view showing the side clearance seal.

FIGS. 10 and 11 show one of the side clearance seals 6 attached to the moving block 4. The moving block 4 is formed into a saddle shape as a whole and has the central part 4a facing the upper surface of the track rail 1 and the stem parts 4b respectively facing the side surfaces of the track rail 1. To the lower end portion of each of the stem parts 4b, each of the side clearance seals 6 is attached. Each side clearance seal 6 is made to be elongated in the moving directions of the moving block 4 and has both ends each coming in contact with each of the end clearance seals secured to the moving block. Hence the clearance between the moving block 4 and the track rail 1 is surrounded by combined components composed of a pair of end clearance seals 5 secured to both ends of the moving block 4 and a pair of side clearance seals located on the side surfaces of the moving block.

Each side clearance seal 6 comprises a flat plate portion 6b used to attach this side clearance seal 6 to the moving block 4 and a protruding portion 6a directed to protrude toward the track rail 1 to narrow a gap between the side clearance seal 6 and the track rail 1. Through the flat plate portion 6b, throughholes 6c are formed which allow securing means such as screws 19 or others (refer to FIG. 3) to attach the side clearance seal 6 to the moving block. The protruding portion 6a is formed to have a surface which is formed to not only be consistent in shape with each side surface of the track rail 1 but also keep a slight clearance 20 between the track rail 1 and the protruding portion 6a.

Figure 12:
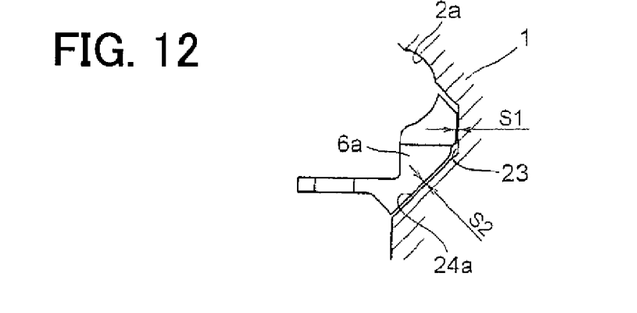
FIG. 12 is a view showing the size of a clearance formed between the side clearance seal and a track rail.

To be more specific, as shown in FIG. 10, the track rail 1 has both side surfaces on each of which a groove consisting of a bottom portion 24c and side wall portions 24a and 24b is formed. One side wall 24b, the lower ball rolling groove 1a is formed. The protruding portion 6a is located to approach the bottom portion 24c and side wall portion 24a of the groove. As shown in FIG. 12, a clearance S1 formed between the protruding portion 6a and the bottom portion 24c is smaller than a clearance S2 between the protruding portion 6a and the side wall portion 24a. The reason is that, in the track rail 1, the tolerance given to the bottom portion 24c is set to a value smaller than the tolerance given to the side wall portion 24a. In this way, in the track rail 1, compared to portions whose tolerances are larger, portions whose tolerances are smaller are allowed to have smaller clearances. The clearances S1 and S2 are set to, for example, 0.02-0.25 mm, preferably 0.05-0.15 mm, in a similar manner to the foregoing case for the end clearance seals 5.

The side clearance seals 6 may be made of resin such as fluorocarbon resin or PEEK material or metal such as stainless steel. In the present embodiment, the protruding portion 6a has a surface 6f to be opposed to the track rail 1 and the surface 6f is formed to be flat, not a concavo-convex shape. In a case where the side clearance seals 6 are made of resin, there is formed a thickness-cut portion 6d at parts other than a surface 6f of the protruding portion 6a facing the track rail 1, as shown in FIG. 11, in which the thickness-cut portion makes a resin thickness approximately constant at each part of each of the side clearance seals. If the same resin-made seal is formed to have thicker parts and thinner parts, the dimensions of the side clearance seal 6 are changed due to shrink mark of the resin. Arranging the thickness-cut portion 6d makes it possible to prevent the side clearance seal 6 from being changed in its dimensions.

The side clearance seals 6 attached to the moving block 4 are movable with no contact with the tack rail 1. A clearance 20 formed between the side clearance seals 6 and the track rail 1 is made as small as possible. Hence when a gas flows in a passage 23 between each side clearance seal 6 and the track rail 1 downward along the track rail 1, the gas flow encounters a large amount of resistance.

The side clearance seals 6 also functions so as to prevent the balls from falling from the moving block 4, when the moving block 4 is removed from the tack rail 1. In order to give this function, a distance between an upper end part 6e of the side clearance seal 6 and an upper end part 25 of the loaded ball rolling groove 2a is designed to be smaller the diameter of each ball 3, as shown in FIG. 10. In addition, on the lower surface of the central part 4a of the moving block 4, there is also disposed a ball retaining member 26 to prevent the balls 3, which roll along the upper-side loaded ball rolling groove 2a, from falling from the moving block 4.

Figure 13:
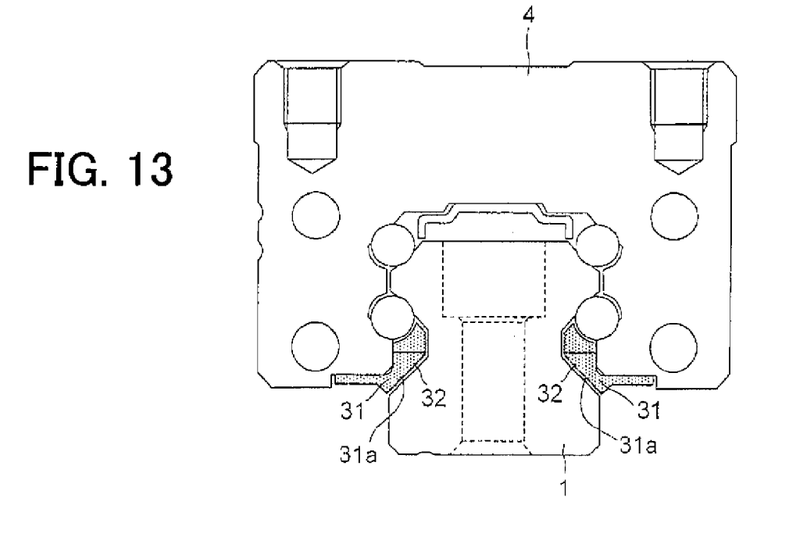
FIG. 13 is a view exemplifying another side clearance seal (in which the seal is attached to the moving block)
Figure 14:
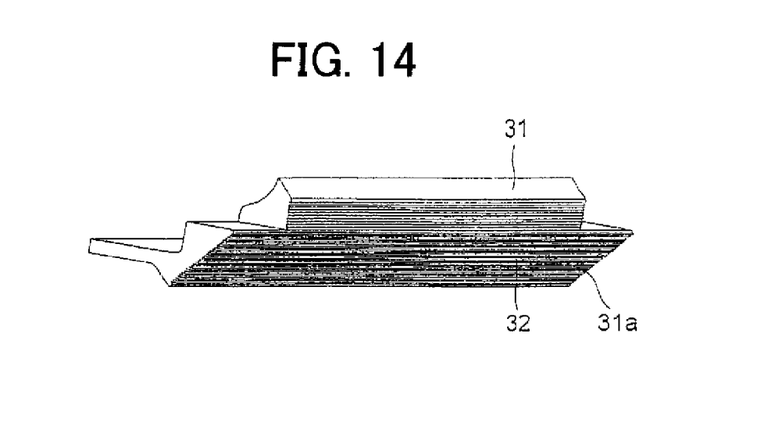
FIG. 14 is a perspective view exemplifying another side clearance seal.
Figure 15:
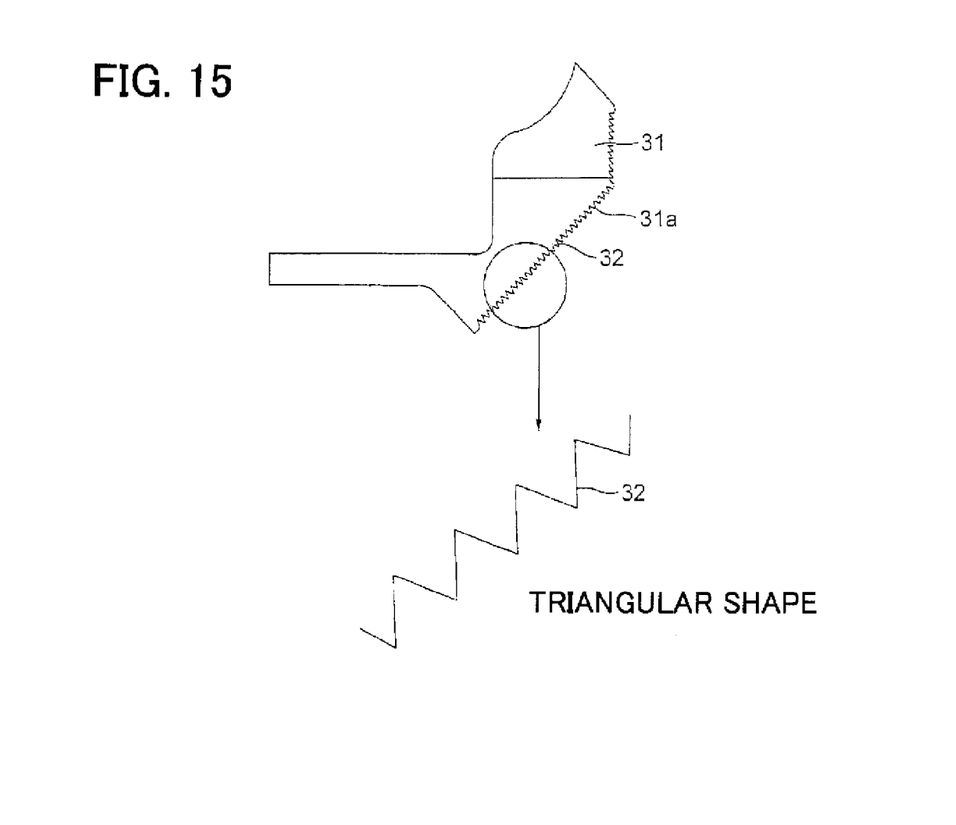
FIG. 15 is a frontal view exemplifying another side clearance seal (partly containing an enlarged view)

FIGS. 13-15 show another example of the side clearance seals. Each of side clearance seals 31 according to this example has a surface 31a facing the track rail 1 on which grooves 32 are formed to provide a concavo-convex shape on the surface 31a. As shown in FIG. 14, the grooves 32 are formed to extend in parallel with the directions along which the side clearance seal 31 extend (i.e., the moving directions of the moving block 4). As shown in FIG. 15, the grooves 32 represent a triangular sectional form with plural triangles. This side clearance seal 31 is identical to the side clearance seal 6 illustrated in FIG. 12 in that the seal 31 has the flat plate portion and the protruding portion as well as the ball retaining function.

In this side clearance seal according to this example, compared to the flat surface, the concavo-convex shape of the surface will cause a larger amount of resistance against a gas flowing along the passage between the side clearance seals 31 and the track rail 1.

Figure 16:
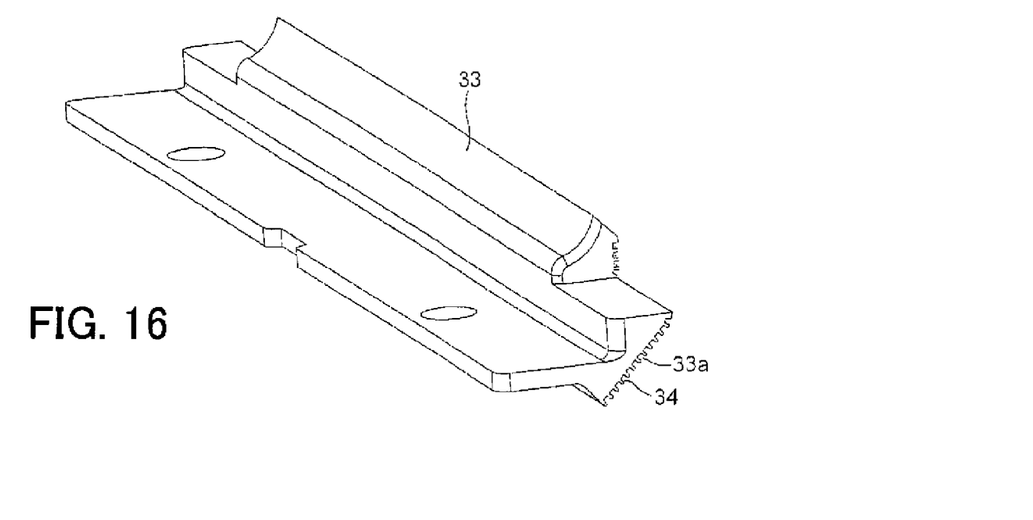
FIG. 16 is a perspective view exemplifying another side clearance seal.
Figure 17:
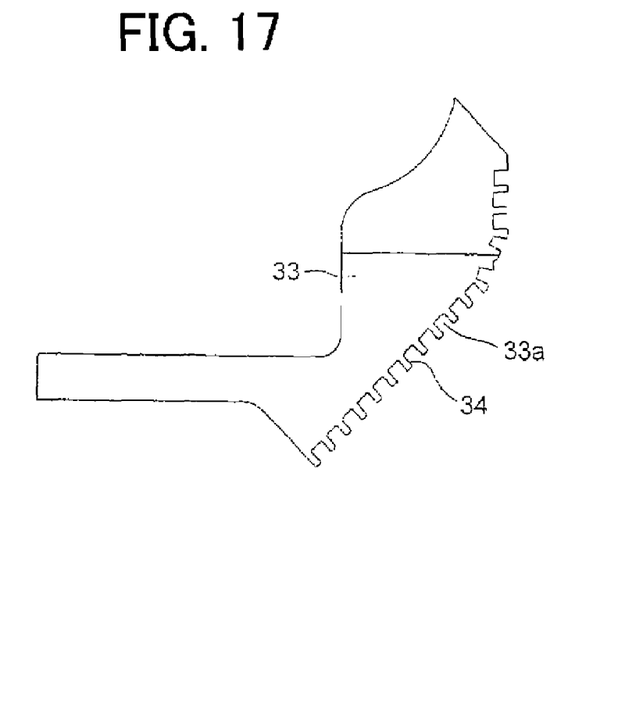
FIG. 17 is a frontal view exemplifying another side clearance seal.

FIGS. 16 and 17 show another example of the side clearance seal. This example provides a side clearance seal 33 comprising a surface 33a facing the track rail 1, in which the surface is formed to have grooves 34 of which sectional form is composed of a series of quadrangles. That is, as shown in this example, the sectional form of the grooves 34 may be quadrangular.

By the way, the present invention may be modified into various other modes without departing from the gist of the present invention. For example, the movement guiding device in accordance with the present invention can be applied to various other devices such as ball splines and ball screws, other than the linear guide. If being applied to a ball spline, the track member is formed as a cylindrical track shaft and the moving member is formed as a cylindrical outer tube which is fit with the track shaft. Moreover, if being applied to a ball screw, the track member is realized as a screw shaft and the moving member is realized as a nut which is fit with the screw shaft. In addition, concerning with the rolling elements, rollers may be used instead of the balls.

EXAMPLE

Figure 18:
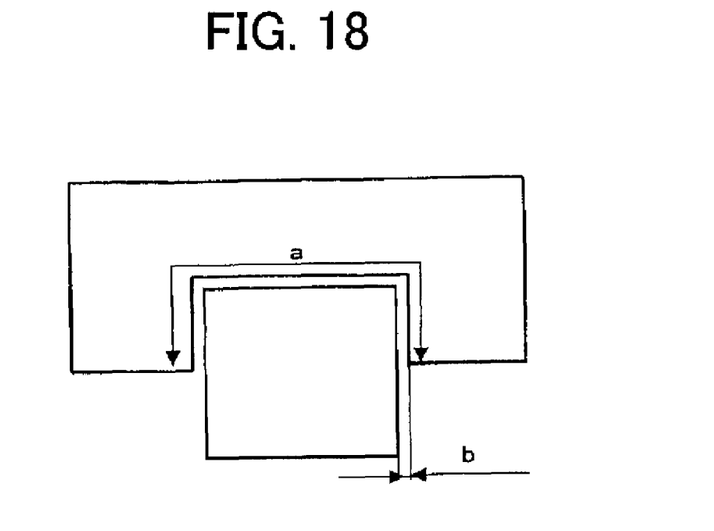
FIG. 18 is a view showing the shape of a clearance used for estimating the conductance.

The conductance was estimated and subjected to comparison between two cases; in one case, the end clearance seal was attached to the moving block and, in the other case, the end clearance seal was not attached to the moving block. FIG. 18 shows the contour of a clearance used for the calculation, in which a dimension "b" denotes the width of the clearance, a dimension "a" does the length thereof, and a dimension "L" does the thickness in the length direction thereof. Table 1 shows the comparisons between the conductance values. The calculated results on this estimation reveal that attaching the end clearance seal to the moving block makes it possible that the conductance value decreases down to approximately $\frac{1}{150}$.

TABLE 1

|  | In a case where an end clearance seal not is attached | In a case where an end clearance seal is attached |
|---|---|---|
| Thickness L | 1 | 1.58 |
| Length a | 1 | 1.02 |
| Width b | 1 | 0.074 |
| Conductance C | $K/2\pi$ | $6.59 \times 10^{-3} \cdot K/2\pi$ |

From the calculated results, it is understood that, for using the movement guiding device in the vacuum environment, the conductance value should be reduced to $3.0 \times 10^{-2}$ (L/s) or less.

Figure 19:
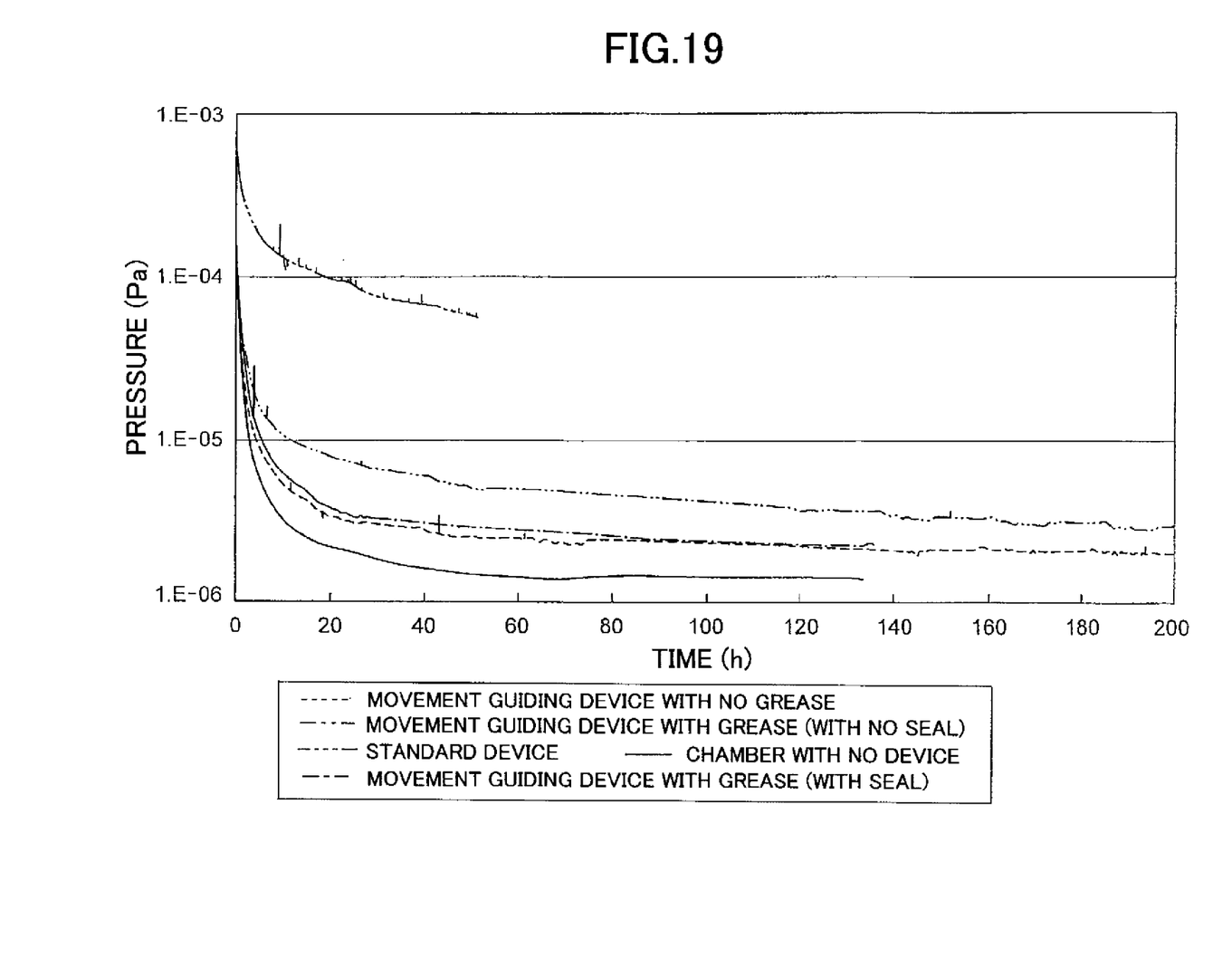
FIG. 19 shows results of a pressure test performed when a vacuum is drawn within a vacuum chamber.

The movement guiding device according to the foregoing embodiment was manufactured and then placed into a vacuum chamber. And a test was conduced to examine how much the grease evaporates and changes to a gas, that is, how much the degree of vacuum decreases. FIG. 19 shows results of a pressure test conducted by drawing a vacuum in the vacuum chamber. In FIG. 19, the longitudinal axis denotes pressures within the chamber and the lateral axis denotes the time.

A solid line in Figure shows changes in the pressure measured in a case where the movement guiding device is not placed in the vacuum chamber, i.e., the performance of the vacuum chamber itself. It is understood that as the vacuuming time elapses, the pressure drops gradually to be balanced finally.

A broken line in Figure shows changes in the pressure measured in a case where a movement guiding device with no grease applied therein was placed in the vacuum chamber for the test. From this line, it is understood that the pressure changes at low values which are close to pressures measured in the empty vacuum chamber. But the pressures are slightly higher than those in the empty vacuum chamber, because very small amounts of gases evaporate from metal parts in the movement guiding device.

Further, a chain double-dashed line in Figure shows changes in the pressure measured in a case where a movement guiding device with grease applied therein was placed in the vacuum chamber for the test. However, no clearance seal was attached to this movement guiding device, so that the grease inside the movement guiding device was easily vaporized to be leaked to the outside. Compared to the broken-line case with no grease applied, the pressures were higher on the whole depending on an amount of leak of the vaporized grease.

Further, a dashed line in Figure shows changes in the pressure measured in a case where a movement guiding device with clearance seals was placed in the vacuum chamber for the test. And a grease was applied to this device and both end and side clearance seals were attached to this device as clearance seals. Attaching the clearance seals prevents the grease from vaporizing and leaking to the outside. Accordingly, it is understood that this dashed-line pressure changes at low values approximately equal to pressures gained in the broken-line case with no grease applied.

Still further, Figure represents a chain triple-dashed line which shows changes in the pressure measured in a case where the standard movement guiding device (not for the vacuum environment; i.e., a general-purpose device with end plates made of resin) is placed in the vacuum chamber. In this case, large amounts of gases were generated from the grease as well as the resin-made end plates, so that the resultant pressures became higher no less than a single-digit increase, compared to the other movement guiding devices tested as above.

The present specification is based on Japanese Patent Application Nos. 2004-337045 filed on Nov. 22, 2004 and 2005-315300 filed on Oct. 28, 2005, the entire contents of which are expressly incorporated by reference herein.

The invention claimed is:

1. A movement guiding device for a vacuum environment, said movement guiding device comprising:
   a track member having a rolling-element rolling part and extending linearly;
   a moving member having a rolling-element circulation passage containing a loaded rolling-element rolling part facing the rolling-element rolling part and moving linearly relatively to the track member;
   a plurality of rolling elements arranged in the rolling-element circulation passage; and
   an end clearance seal arranged with an end of the moving member in moving directions thereof, formed to have an opening of which contour is consistent with a sectional form of the track member and preventing vaporized lubricant oil or grease from leaking outside the movement guiding device and into the vacuum environment,
   wherein the end clearance seal is located without coming in contact with the track member and a clearance formed between the end clearance seal and the track member is smaller than a clearance formed between the moving member and the track member,
   the end clearance seal has a surface facing the track member, which surface is formed to have a concavo-convex shape in a longitudinal direction of the track member,
   the end clearance seal comprises a plurality of first plates formed into thin plates and a plurality of second plates formed into thin plates, wherein the first and second plates are laminated on one another in a alternate order between the first and second plates;
   the first and second plates have an opening whose contour is made consistent with a shape of the track member; and
   a clearance formed between the second plates and the track member is made larger than a clearance formed between the first plates and the track member so that the surface of the end clearance seal, which surface faces the track member, is formed to have the concavo-convex shaped, provided the first and second plates are laminated on one another.

2. A movement guiding device for a vacuum environment, said movement guiding device comprising:
   a track member having an upper surface and side surfaces and having a longitudinal direction, wherein a rolling-element rolling part is formed on the track member so as to extend along the longitudinal direction and the track member extending linearly;
   a moving member i) having a central part facing the upper surface of the track member and stem parts facing the side surfaces of the track member so that the moving member is formed into a saddle shape as a whole, ii) having a rolling-element circulation passage containing a loaded rolling-element rolling part facing the rolling-element rolling part; and iii) moving linearly relatively to the track member;
   a plurality of rolling elements arranged in the rolling-element circulation passage;
   a side clearance seal arranged on each of the stem parts of the moving member and located to extend over both ends of the moving member in moving directions thereof; and
   wherein the side clearance seal is located without coming into contact with the track member, a clearance formed between the side clearance seal and the track member is smaller than a clearance formed between the track member and the moving member and the side clearance seal prevents vaporized lubricant oil or grease from leaking outside the movement guiding device and into the vacuum environment, and
   the side clearance seal has a surface facing the track member, which surface of the side clearance has a plurality of grooves formed thereon so as to extend the moving directions of the moving member.

3. The movement guiding device for the vacuum environment according to claim 2, characterized in that the device further comprises an end clearance seal arranged with each of the ends of the moving member in the moving directions thereof and formed to have an opening of which contour is consistent with a sectional form of the track member,
   wherein the end clearance seal is located without coming in contact with the track member and a clearance formed between the end clearance seal and the track member is smaller than a clearance formed between the moving member and the track member.

* * * * *